(12) United States Patent
Hsu et al.

(10) Patent No.: US 6,250,804 B1
(45) Date of Patent: Jun. 26, 2001

(54) SELF-LUBRICATING LINEAR GUIDE APPARATUS

(75) Inventors: Wu-Chang Hsu, Tai-Chung; Yi-Pei Shih, Tai-Nan; Kuo-Jung Chang, Tai-Chung, all of (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 09/406,807

(22) Filed: Sep. 28, 1999

(30) Foreign Application Priority Data

Mar. 5, 1999 (TW) .................................. 88203321

(51) Int. Cl.$^7$ .................................................. F16C 29/06
(52) U.S. Cl. .................................. 384/13; 384/45
(58) Field of Search .......................... 384/15, 45; 184/5, 184/100

(56) References Cited

U.S. PATENT DOCUMENTS

| 4,582,369 | * | 4/1986 | Itoh ........................................ 384/13 |
| 5,399,023 | * | 3/1995 | Winkelmann et al. ................. 384/13 |
| 5,496,113 | * | 3/1996 | Winkelmann et al. ................. 384/13 |
| 5,570,958 | * | 11/1996 | Tsukada ................................. 384/45 |
| 5,615,955 | * | 4/1997 | Namimatsu et al. ................... 384/13 |
| 5,694,811 | * | 12/1997 | Tsukada ............................. 384/13 X |
| 5,695,288 | * | 12/1997 | Sugihara et al. ....................... 384/13 |
| 6,024,490 | * | 2/2000 | Shirai .................................... 384/13 |

* cited by examiner

*Primary Examiner*—Thomas R. Hannon
(74) *Attorney, Agent, or Firm*—Dougherty & Troxell (57) ABSTRACT

A self-lubricating linear guide apparatus in which a lubricant storage chamber is formed within the slider so that no additional space is required. A fibrous member is employed which is inserted into the lubricant storage chamber to directly lubricate unloaded rolling elements such that loss of lubricant oil due to leakage is minimized and contamination to the working site is prevented. In addition, metallic powder or dust produced during manufacturing process can not ingress into the slider to choke up the fibrous member. An oil infusing aperture is reserved on the slider for replenishing the lubricant oil into the lubricant storage chamber in the case that lubricant oil stored therein is used up without the need of detaching the linear guide apparatus. The self-lubricating linear guide apparatus completely eliminates the disadvantage of too frequent lubricant oil replenishment as that is necessary for conventional techniques.

3 Claims, 11 Drawing Sheets

SELF-LUBRICATING LINEAR GUIDE APPARATUS

BACKGROUND OF THE INVENTION

1. Field of the Invention

This invention relates to a highly sealed self-lubricating linear guide apparatus, and more particularly, to a self-lubricating linear guide apparatus which can automatically lubricate rolling elements in the unloaded rolling passages of a linear guide with the lubricant stored in the slider while the slider is moving, and its lubricating function may last through the whole life time of the linear guide.

2. Description of the Prior Art

Figure 1:
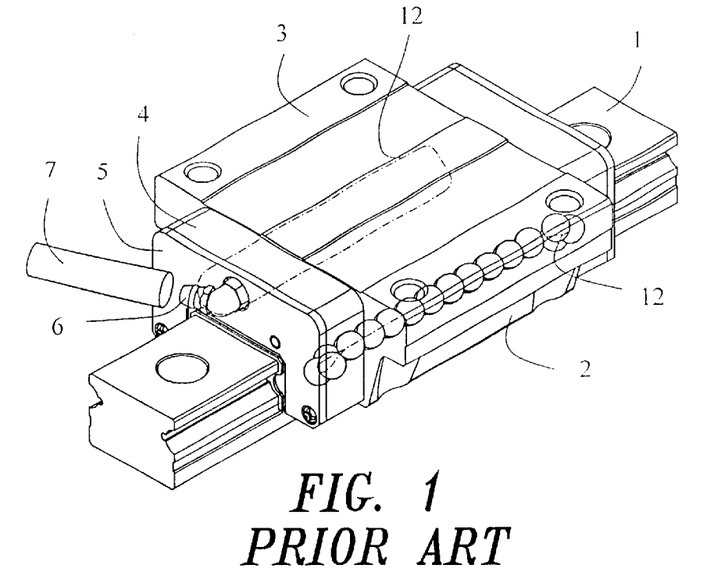
FIG. 1 is the perspective view of a conventional manually lubricated linear guide.
Figure 2:
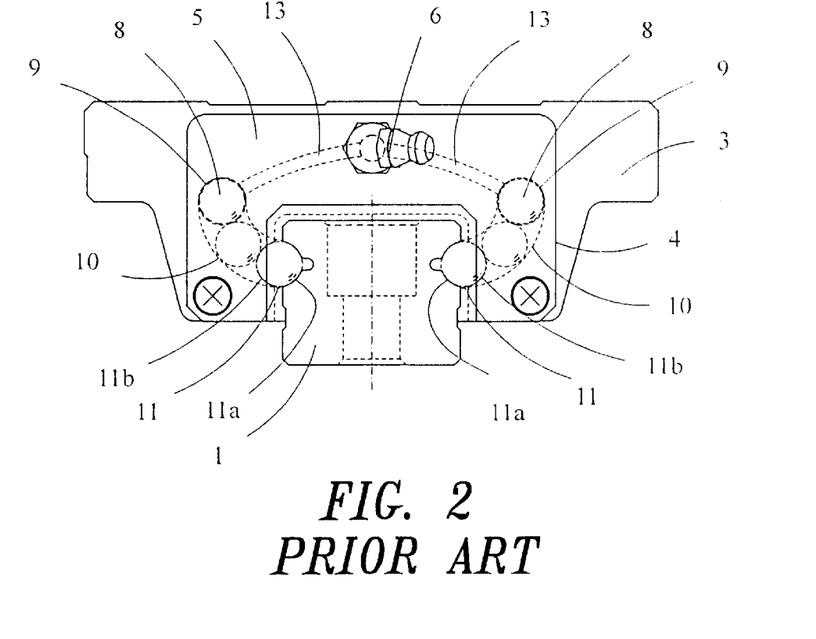
FIG. 2 is the front view of a conventional manually lubricated linear guide.
Figure 3:
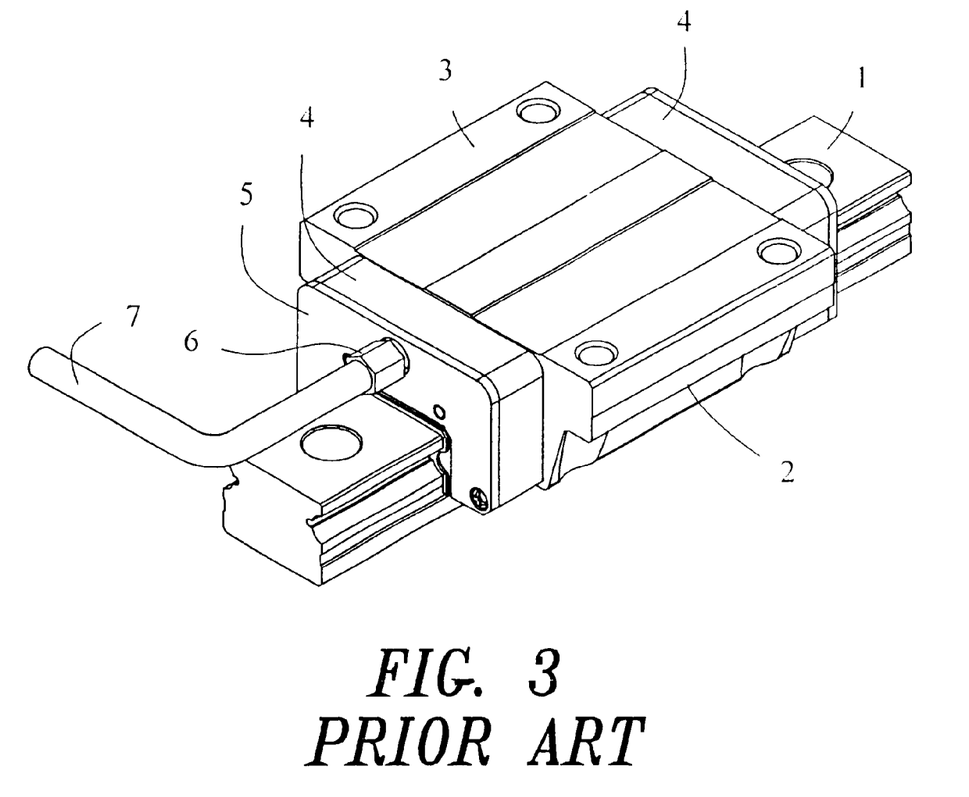
FIG. 3 is the perspective view of a linear guide with a conventional automatic lubricating apparatus.

Two examples of conventional manual-lubricating linear guide apparatuses are shown in FIG. 1, 2 and 3. It is well known that a linear guide consists of an endlessly extendable guide rail 1 and a slider 2 is composed of a slider body 3 and end caps 4 attached to both ends of the slider body 3 which moves along the guide rail 1. Inner passages 9 in the slider body 3 and the inner return passages 10 provided in both end caps 4 form unloaded rolling passages,and guide rail rolling grooves 11a, and rolling grooves for slider 11b (The grooves are arc shaped if rolling elements are steel balls as shown in FIGS. mentioned above, if rolling elements are rollers, the shape of the grooves is linear) constitute loaded rolling grooves. Unloaded rolling passages and loaded rolling grooves constitute circulation passages 12. A certain numbers of rolling elements 8 are employed in the circulation passages 12 for endlessly circulating motion. The slider 2 moves with a low friction resistance along the guide rail 1 by means of the rolling elements 8. A lubrication passage 13 is formed in each end cap 4 attached to the slider body 3. Lubricant grease can be charged therein with an grease gun 7 through a grease nipple 6 fixed to the side of an end cap 4. Incidentally, the lubricant grease flows into the circulation passage 12 along the lubrication passage 13 so as to lubricate the rolling elements 8. Alternatively, as shown in FIG. 3, an oil pipe 7 from an automatic lubrication system is connected to an oil-pipe joint 6 provided at the side of an end cap for supplying the lubricant to the rolling elements 8 via the lubricant passage 13 in a fixed time interval. However, the two lubrication methods mentioned above have a common shortcoming that the sealing effect for lubricant has been too poor. Leakage of more than 95% lubricant is inevitable which causes not only loss of operation cost but also contamination of surroundings. In addition, large amount of lubricant loss causes shortage of lubrication for linear guide in long distance application. As a result, the life of a linear guide will be severely shortened. Therefore, for prolonging the life of linear guide, the lubricant must be replenished frequently.

Figure 4:
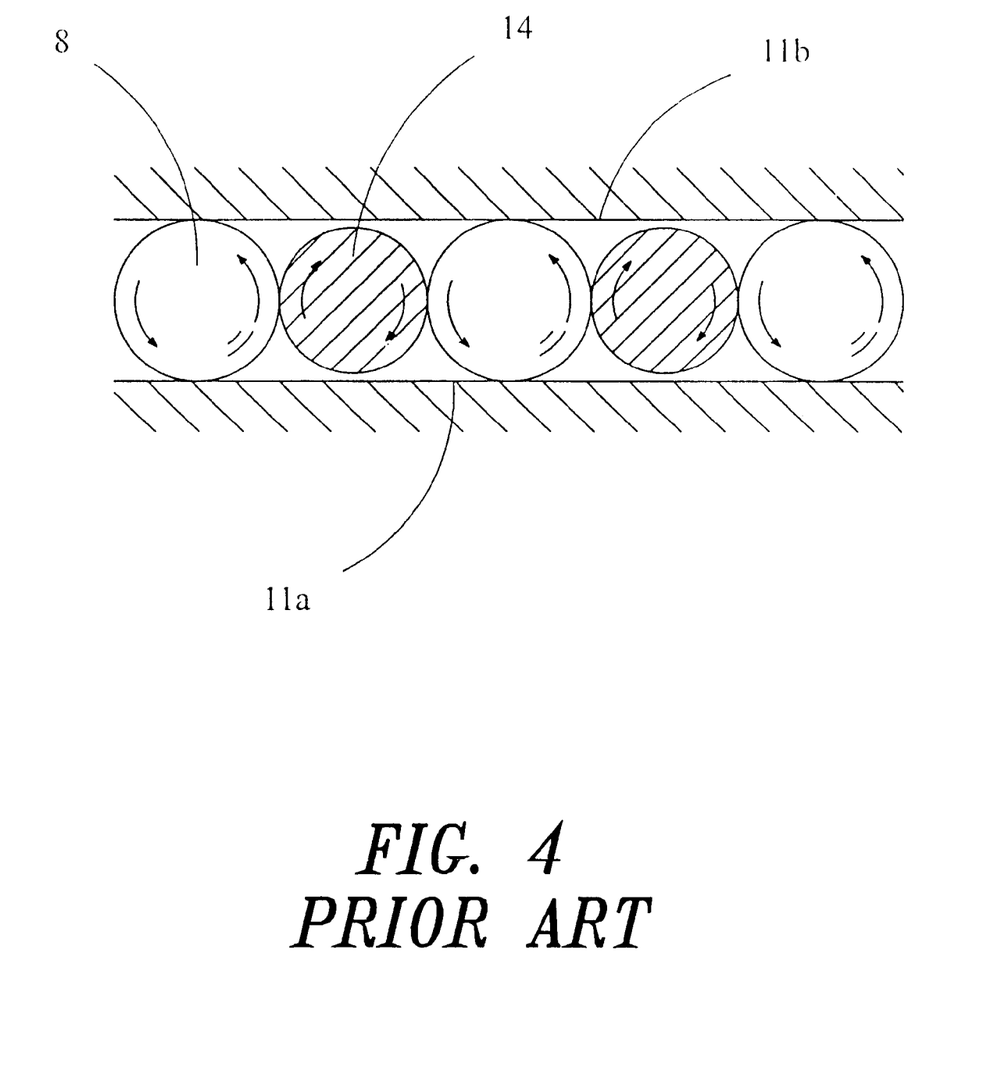
FIG. 4 is a schematic drawing of the lubricating apparatus for the linear guide disclosed by U.S. Pat. No. 5,615,955.

There was recently a comparatively improved technique in this field disclosed by U.S. Pat. No. 5,615,955 shown as FIG. 4. In this cited case lubricant containing polymer spacer balls 14 of smaller diameter then that of steel balls are employed together with circulating steel balls 8 spacing with each other. When the slider moves the polymer spacer balls 14 can exude their containing lubricant to lubricate adjacent rolling steel balls 8 by mutual friction therebetween. However, the most disadvantageous shortcoming of this design is that the available amount of steel balls will be reduced to about half as many as that without using polymer spacer balls since some space is occupied by the latter. As a result, the load rating of the linear guide has to be reduced to ½ as large as that in the case full amount of steel balls are utilized.

Figure 8:
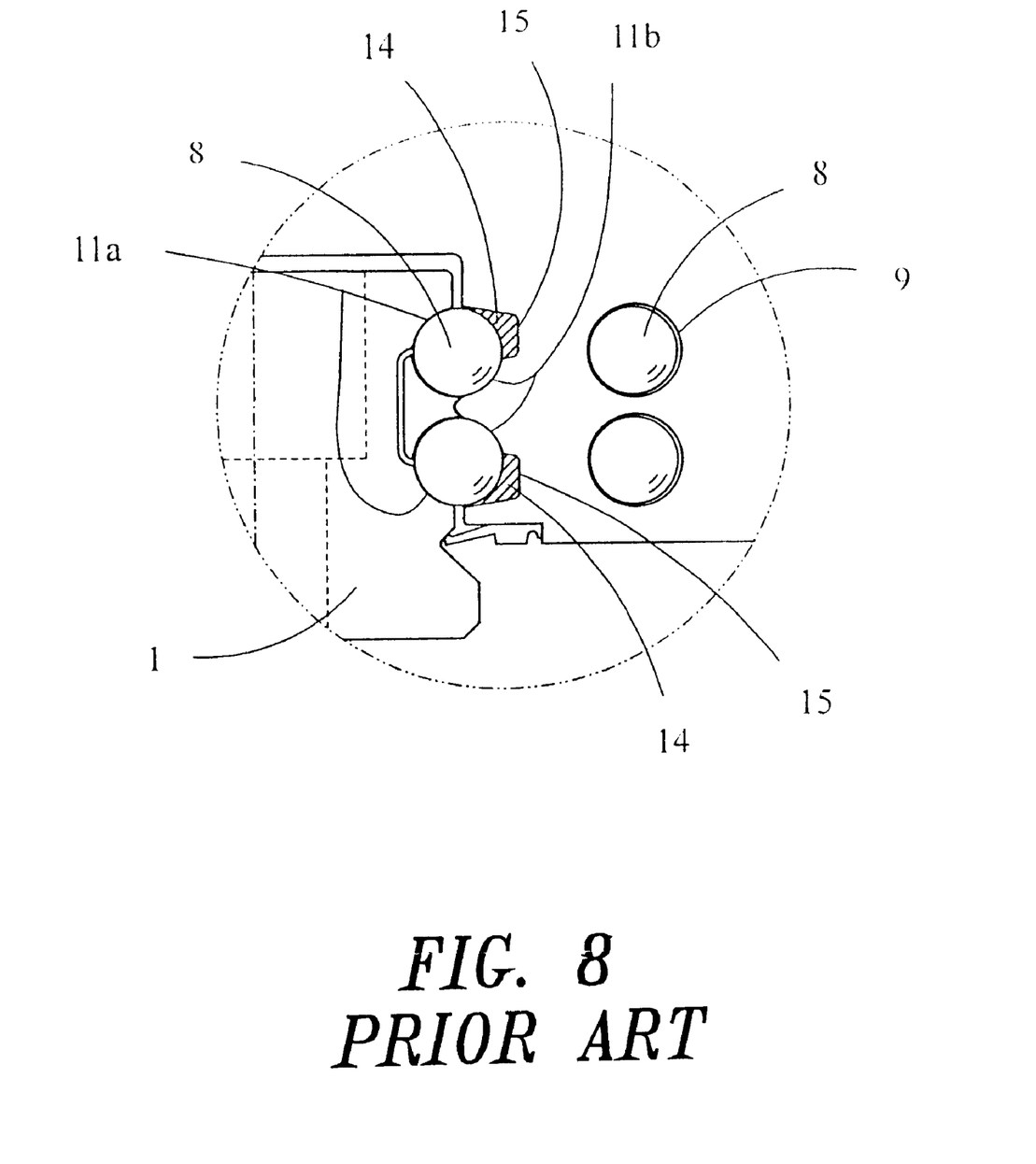
FIG. 8 is the schematic drawing in an embodiment of example 1.

FIG. 8 is a drawing illustrating an embodiment of this cited invention. A recessed groove 15 is provided for both the loaded rolling grooves 11b approximately at the half of unloaded portion and a strip shaped lubricant-containing polymer 14 is inserted in each recessed groove 15. This polymer 14 contacts with the rolling balls 8 tightly to impart its lubricant to the rolling balls 8 so as to lubricate the rolling balls 8. The lubrication effect is achieved by mutual contact between the rolling balls 8 and the lubricant containing polymer 14 during rotation of the balls 8. Incidentally, as soon as the lubricant containing polymer 14 is worn due to long time abrasion with the rolling balls 8, the mutual contact therebetween becomes incomplete, or in the worst case, becomes completely apart from each other. Accordingly, the lubrication effect for the linear guide apparatus is degraded. Further, as soon as the limited lubricant content in the polymer 14 is used up, no further lubrication effect can be expected for this system since the lubricant containing polymer can not be replaced, nor can the lubricant be replenished.

Figure 5:
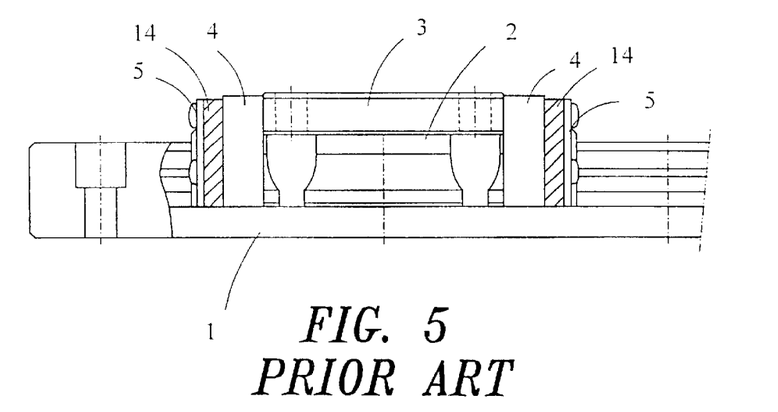
FIG. 5 is the side view of the linear guide with the lubricating apparatus disclosed by U.S. Pat. No. 5,857,779.
Figure 6:
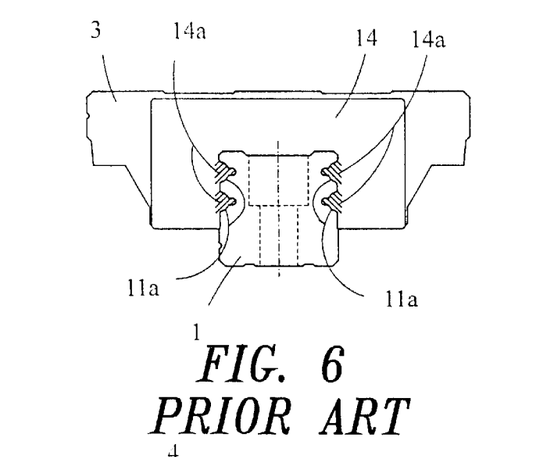
FIG. 6 is the front view of the linear guide with the lubricating system disclosed by U.S. Pat. No. 5,857,779.
Figure 7:
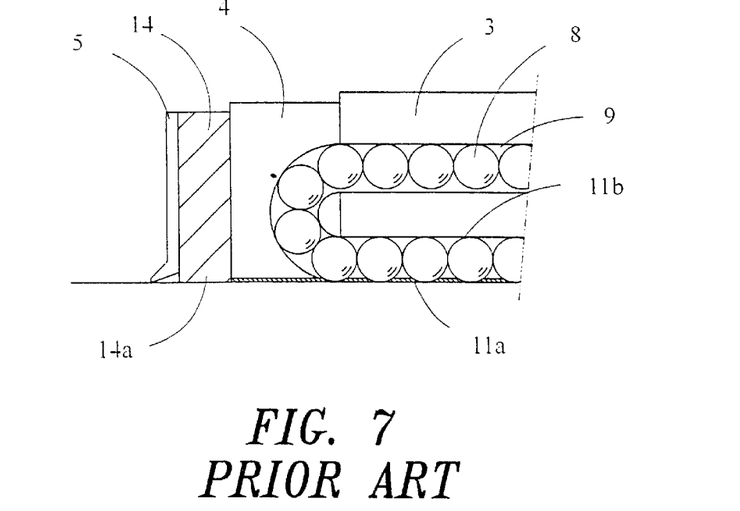
FIG. 7 is a schematic drawing of the lubricating apparatus for the linear guide disclosed by U.S. Pat. No. 5,857,779.
Figure 9:
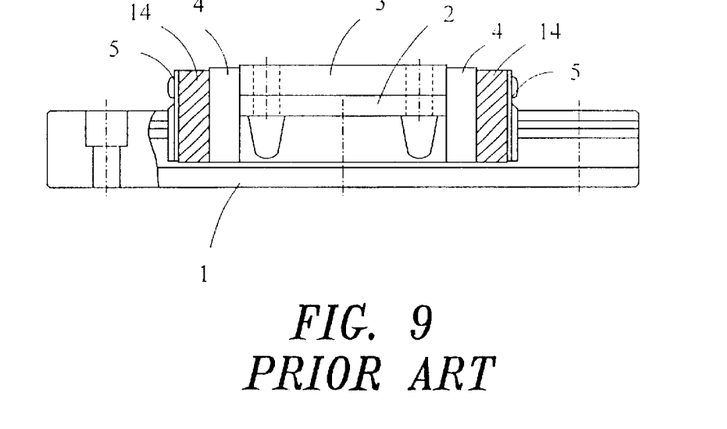
FIG. 9 is the side view of the linear guide apparatus with the lubricating apparatus in an embodiment of example 2.
Figure 10:
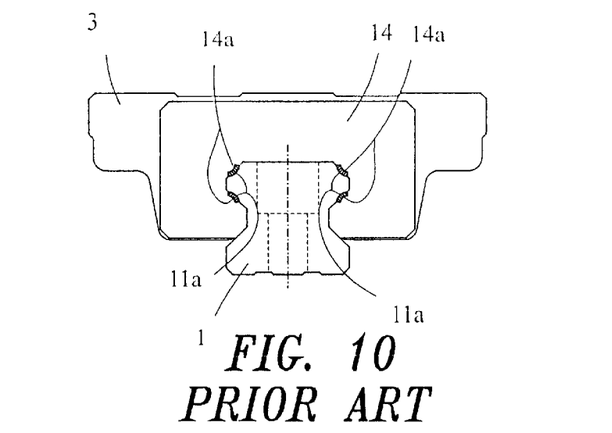
FIG. 10 is the front view of FIG. 9.
Figure 11:
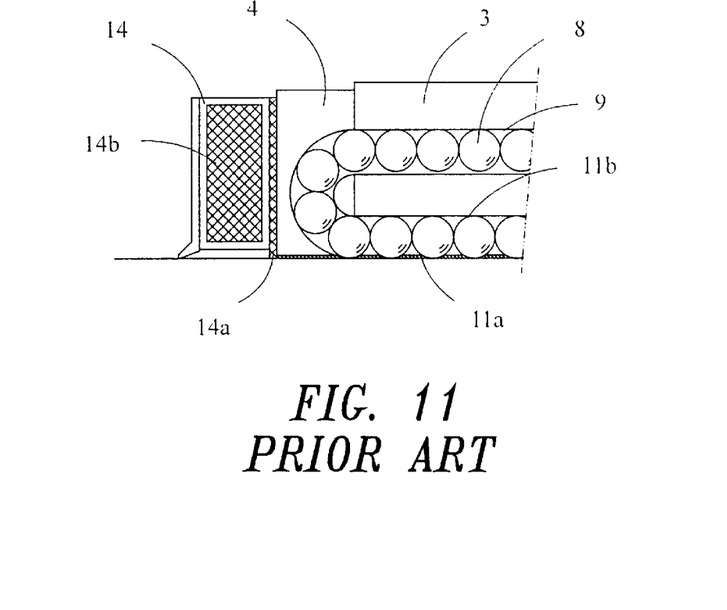
FIG. 11 is the schematic drawing in the same embodiment shown in FIG. 9.

FIGS. 5 through 7 illustrate another recent invention patented by U.S. Pat. No. 5,857,779. Here, a lubricant containing polymer 14 is attached to each side of the slides. The outer appearance of this lubricant containing polymer 14 is such that a projected portion 14a is adjacent to the surface of rolling grooves 11a. When the slider 2 moves, the lubricant contained in the polymer 14 is exuded to lubricate the surface of the guide rail rolling grooves 11a. Furthermore, in another embodiment of this cited case shown in FIGS. 9 through 11, a lubricant containing member 14 is provided at each side of the slider. The figure of the member 14 resembles a end cap 4 with a hollow inner portion in which a material 14b with excellent oil absorbing property and full of lubricant oil is filled. A non-woven cloth 14a is placed near each end cap 4 for contacting with the surface of the guide rail rolling grooves 11a. When the slider 2 moves the non-woven cloth 14a continuously oozes the lubricant from the lubricant containing member 14 to lubricate the surface of the guide rail rolling grooves 11a through mutual contact. As soon as the rolling balls 8 come to the surface of the guide rail rolling grooves 11a, the rolling balls 8 can be lubricated with the lubricant thereon. However, such a design mentioned above has shortcomings. First, it is difficult to install the whole quantity of lubricant needed through the life time of the linear guide. Second, the slider becomes bulky and too long as it has to load a large amount of lubricant. Third, the surface of the linear guide apparatus is often contaminated with foreign material such as metallic powder, grains, dust or the like which greatly degrade the lubrication effect and shorten the life of the linear guide apparatus as well. Fifth, replenishment of lubricant is hard and sacrificing the operation time as the whole apparatus has to be detached and then reassembled. Sixth, the lubrication effect is insufficient since the rolling grooves for slider block is indirectly lubricated only by the lubricant carried by the rolling elements. Seventh, it is wasteful to form oil film on entire surface of the guide rail rolling grooves since the contact between the steel ball and the surface of the grooves is a point contact, thus too much lubricant will be wasted. In all, the two cited cases mentioned above utilize a lubrication method of direct lubricant supply by frictional contact between the lubricant containing media and the mechanical parts to be lubricated, therefore, there is a large frictional loss which lowers mechanical efficiency.

SUMMARY OF THE INVENTION

The present invention has been made in order to eliminated the disadvantage inherent to the conventional techniques as mentioned above. Accordingly, it is an object of the present invention to provide a self-lubricating apparatus in the slider of a linear guide without occupying any additional space to automatically lubricate it, and it is another object of the present invention to provide a self-lubricating apparatus in the slider of a linear guide with it the lubricant can be saved and environmental contamination can be prevented.

To achieve these objects, according to the present invention, a fixed amount of lubricant is charged and sealed in a lubricant storage chamber formed within a moving slider of the linear guide, and by means of a fibrous member, the lubricant is gradually introduced into a rolling elements circulation passages from the lubricant chamber in accordance with siphonage principle via a lubricant guide passage so as to lubricate the rolling elements. The rolling elements employed can be steel balls, rollers, or the like. The lubricant oil stored in the lubricant storage chamber within the slider is able to flow automatically to both sides of the lubricant storage chamber when the slider swings right and left so that there is no worry about lack of lubrication in the case that lubricant stocked in the lubricant storage chamber is getting insufficient. In addition, the lubricant is directly applied to the rolling elements instead of on the surface of guide grooves so as to attain excellent lubrication effect and prevent wasting lubricant. Moreover, an oil-infusing aperture in connection with the lubricant storage chamber is provided on the slider so that the lubricant can be replenished from this oil-infusing apparatus to the linear guide apparatus without detaching it. The self-lubricating apparatus according to the present invention has a perfect sealing effect which enables the linear guide apparatus to maintain in good lubricated state for a long distance and long time operation with very little lubricant leakage to achieve the object of saving lubricant and preventing environmental contamination since the lubricant is applied to the rolling elements directly in stead of applying on the surface of the linear guide grooves. The self-lubricating apparatus for linear guide designed as such overcomes successfully the problem inherent to the conventional techniques that 95% of lubricant is lost by leakage. Incidentally, the self-lubricating apparatus is accommodated in the slider without occupying any additional space in the linear guide.

BRIEF DESCRIPTION OF THE DRAWINGS

The drawings disclose illustrative embodiments of the present invention which serve to exemplify the various advantages and objects hereof, and are as follows.

DETAILED DESCRIPTION OF THE PREFERRED EMBODIMENT

Figure 12:
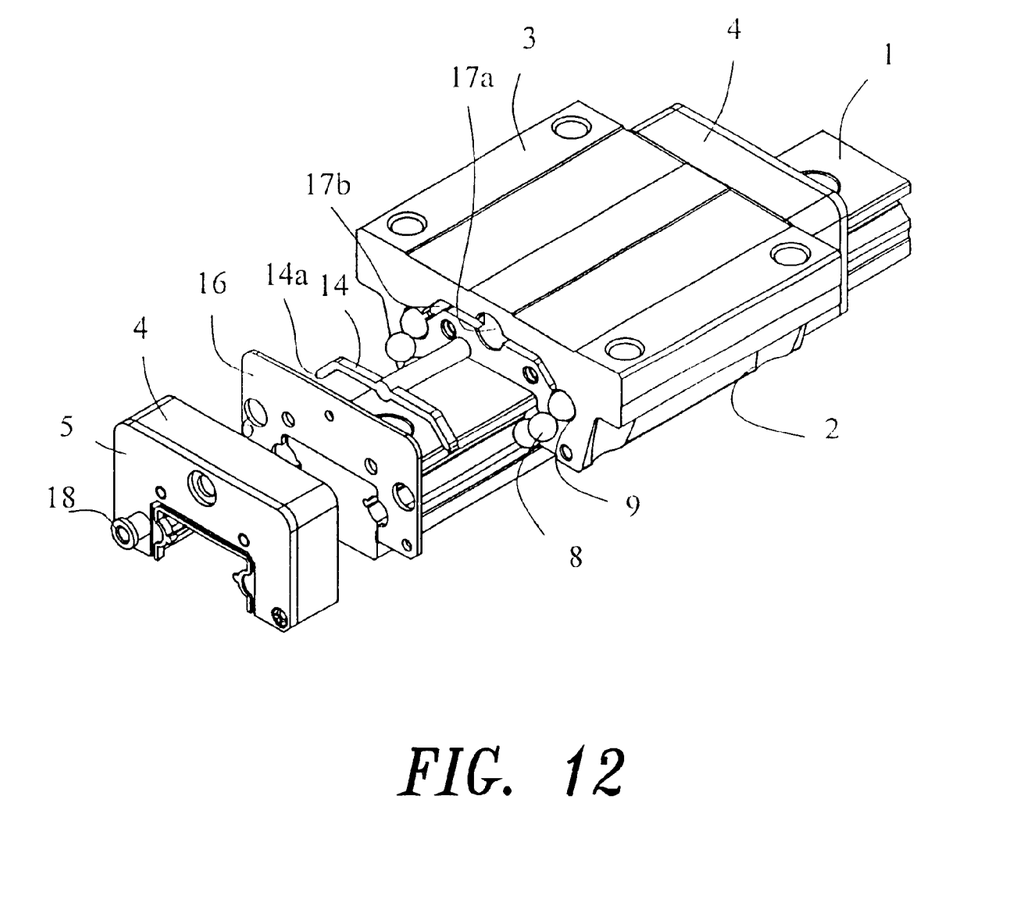
FIG. 12 is the perspective view illustrating the structure of self-lubricating linear guide apparatus in a first embodiment of the present invention.
Figure 13:
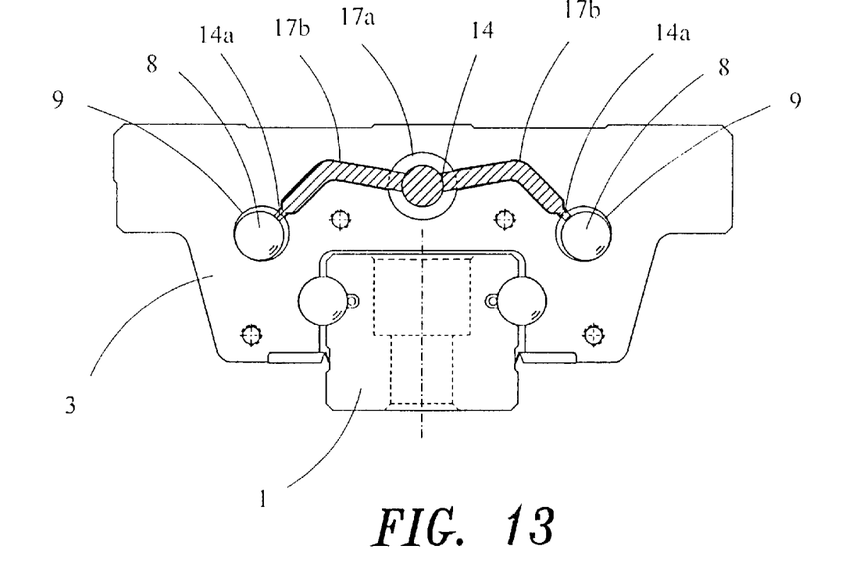
FIG. 13 is the front view of self-lubricating linear guide apparatus in a first embodiment of the present invention in which an end cap of the slider is removed.
Figure 14:
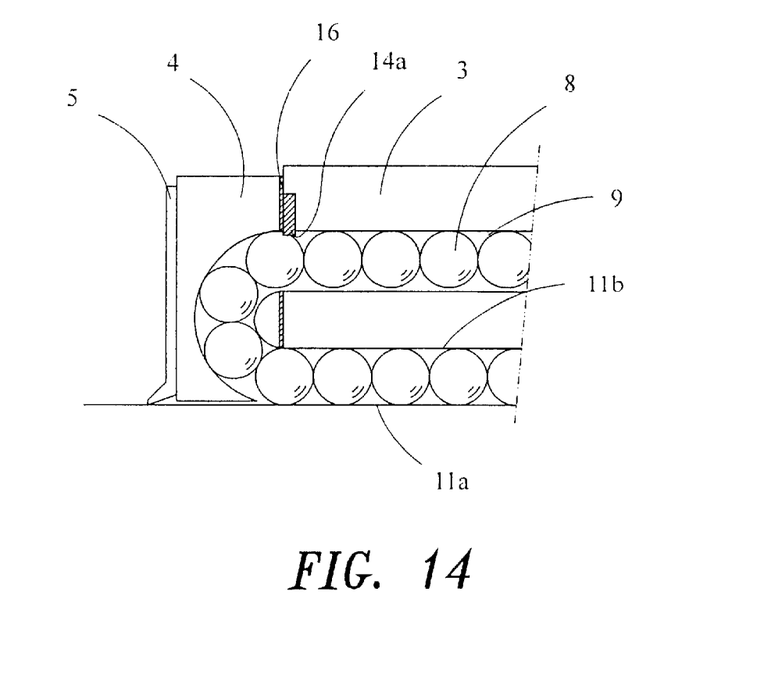
FIG. 14 is a schematic drawing of self-lubricating linear guide apparatus in a first embodiment of the present invention.

FIG. 12 through 14 are the drawings of the product in a first embodiment according to the present invention. An lubricant storage chamber 17a is formed in a slider body 3 for storing sufficient amount of lubricant oil able to last through the life of the linear guide. Two lubricant guide passages 17b are formed each at one side of the slider body 3 with the lubricant storage chamber 17a as their center thereby connecting two rolling element passages 9 each disposed at one side within the slider body 3. A fibrous member 14 is inserted into the lubricant storage chamber 17a and is extended along both lubricant guide passages 17b to protrude out of each end of the two rolling element passages 9 thereby enabling a protruded portion 14a of the fibrous member 14 to contact with circulating rolling elements 8. The fibrous member 14 with excellent oil absorption and low-abrasion characteristics absorbs the lubricant oil stored in the lubricant storage chamber 17a by syphonage principle and lubricates the rolling elements 8 coming to the exit of the passage 9 with lubricant contained in its protruded portion 14a. The consumed lubricant from the protruded portion 14a is soon replenished from the lubricant storage chamber 17a continuously according to the principle that oil tends to keep balanced in its density. Therefore, the rolling elements 8 are always kept in lubricates state. Further, since the fibrous member 14 extends to reach inside the lubricant storage chamber 17a, the mounting state of the linear guide does not affect the behavior of the fibrous member to absorb lubricant oil from the lubricant storage chamber 17a to lubricate the rolling elements running along the passage 9. There is an oil infusing aperture 18 provided on the slider for charging lubricant oil into the lubricant storage chamber 17a with an oil injector 19 through the aperture 18 when the lubricant oil in the chamber 17a is used up. There is a sealing washer 16 interposed between the slider body 3 and its end cap 4 at the location near the opening of the lubricant storage chamber 17a so as to prevent lubricant oil from leaking therebetween.

Figure 15:
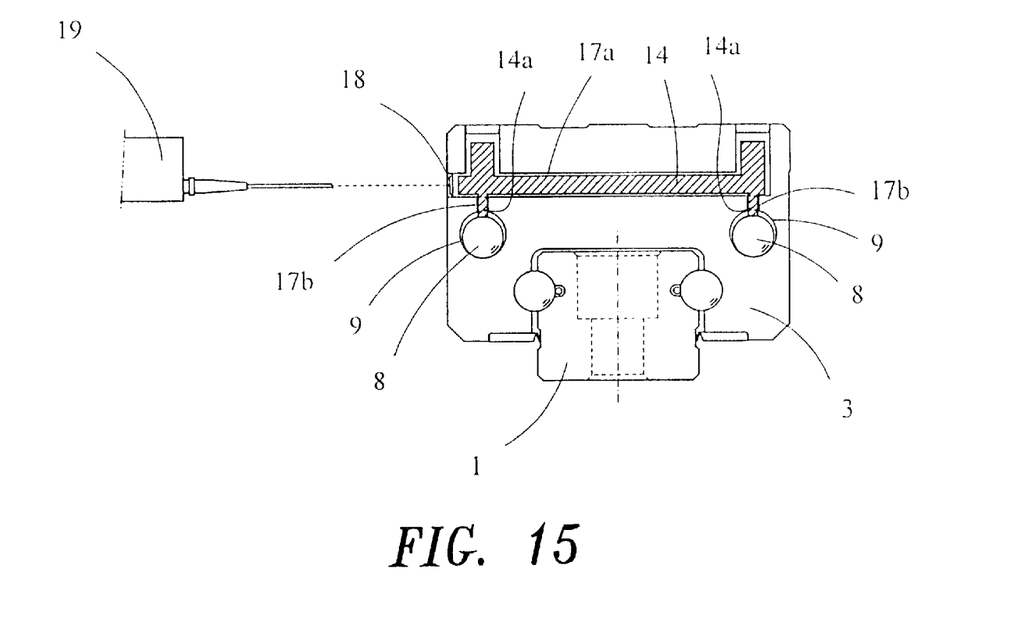
FIG. 15 is the cross sectional drawing of the slider body in the self-lubricating linear guide apparatus in a second embodiment of the present invention.
Figure 16:
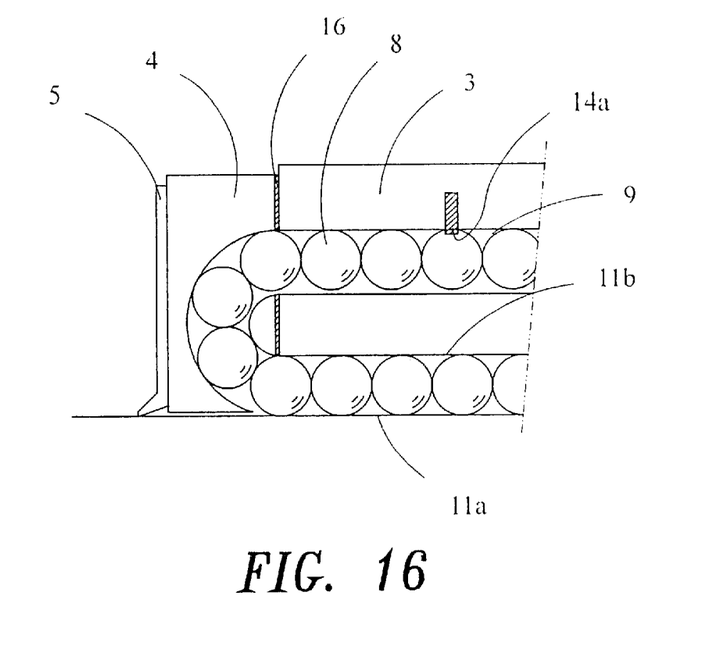
FIG. 16 is a schematic drawing of self-lubricating linear guide apparatus in a second embodiment of the present invention.

FIGS. 15 and 16 show the product of the present invention in a second embodiment. A lubricant storage chamber 17a is formed above the two rolling element passage 9 within the slider body 3 for storing the lubricant oil to be used by the linear guide for its whole life time. Two lubricant guide passages 17b are formed within the slider body 3 each connecting the lubricant storage chamber 17a with one rolling element passage 9. A fibrous member 14 is inserted into the chamber 17a and extended along both lubricant guide passage 17b and then protruding a portion 14a of it to each rolling element passage 9 so as to contact with the rolling elements 8. When the slider 2 moves, the protruded portion 14a of the fibrous member 14 lubricate the rolling elements 8 therethrough with lubricant oil. There is also a piece of sealing washer 16 interposed between the slider body 3 and its end cap 4 thereby preventing leakage of the lubricant oil therefrom. In addition, similar to a first embodiment of the present invention, an oil infusing aperture 18 is provided on the slider for charging lubricant oil into the lubricant storage chamber 17a with an oil injector 19 through the aperture 18 when the lubricant oil in the chamber 17a is used up.

Figure 17:
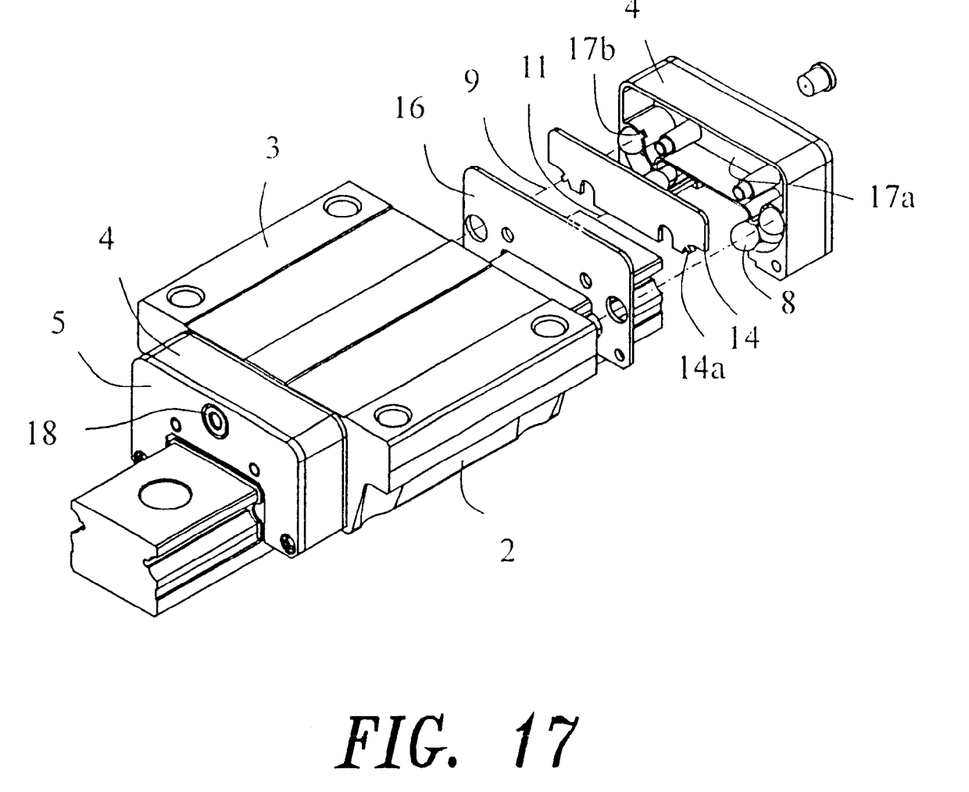
FIG. 17 is the perspective view illustrating the structure of self-lubricating linear guide apparatus in a third embodiment of the present invention.
Figure 18:
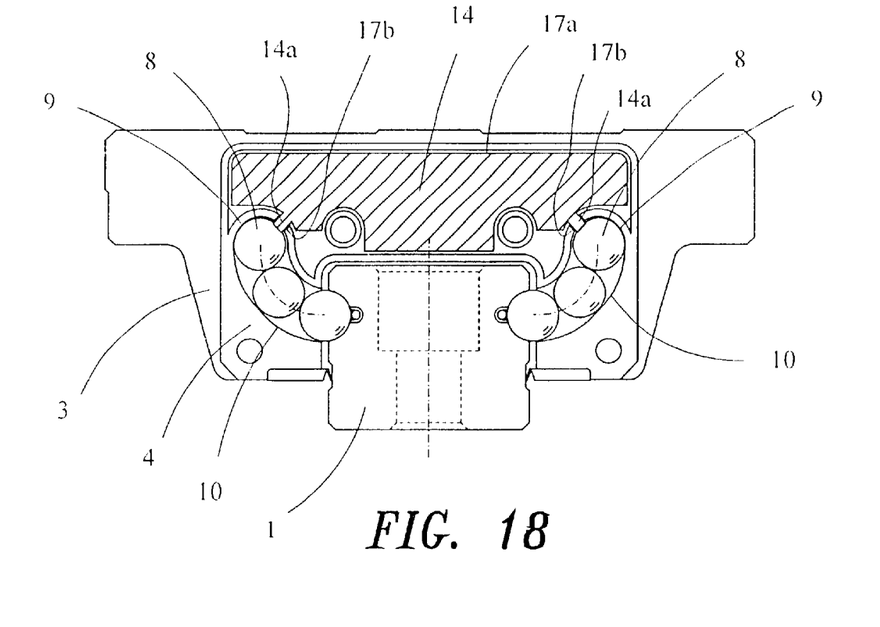
FIG. 18 is the cross sectional drawing of the end cap of the slider in self-lubricating linear guide apparatus in a third embodiment of the present invention.
Figure 19:
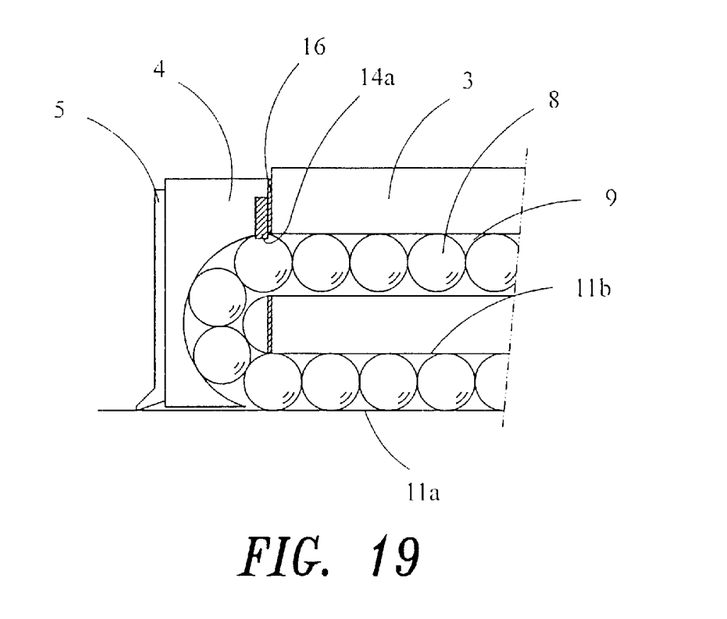
FIG. 19 is a schematic drawing of self-lubricating linear guide apparatus in a third embodiment of the present invention.

FIGS. 17 through 19 show the product of the present invention in a third embodiment. A lubricant storage chamber 17a is formed within the end cap 4 of the slider for storing the lubricant oil to be used by the linear guide for its whole life time. A lubricant guide passage 17b is formed at each of the return passages 10 located at both sides within the end caps 4. A fibrous member 14 is inserted into the chamber 17a and extended along both lubricant guide passages 17b and then protruding a portion 14a of it to each return passage 10 so as to be able to get in contact with the rolling elements 8. When the rolling elements reach the return passages 10 and get in contact with the protruded portion 14a of the fibrous member 14, the rolling elements 8 are lubricated by the lubricant oil contained thereon to achieve the object of lubrication. Similar to two aforementioned embodiments, there is also a piece of sealing washer 16 interposed between the slider body 3 and its end cap 4 thereby preventing leakage of the lubricant oil therefrom. In addition, an oil infusing aperture 18 is provided on the slider connected with the lubricant storage chamber 17a for charging lubricant oil therein in the case that lubricant oil stored in the chamber 17a is used up.

The self-lubricating apparatus for the linear guide according to the present invention is provided within the slider so that no additional space is required. A fibrous member is employed which is inserted into the lubricant storage chamber to directly lubricate unloaded rolling elements such that loss of lubricant oil due to leakage is minimized and contamination to the working site is prevented. In addition, metallic powder or dust produced during manufacturing process can not ingress into the slider to choke up the fibrous member. A lubricant oil infusing aperture is reserved on the slider for replenishing the lubricant oil into the lubricant storage chamber in the case that the lubricant oil stored therein is used up but without detaching the linear guide apparatus.

Incidentally, the product of the present invention can be widely applied to all kinds of linear rolling bearing, linear guideways, linear ball bushes and ball splines for their automatic lubrication.

Many changes and modifications in the above described embodiments of the invention can, of course, be carried out without departing from the scope thereof. Accordingly, to promote the progress in science and the useful arts, the invention is disclosed and is intended to be limited by the scope of the appended claims.

What is claimed is:

1. A self-lubricating linear guide apparatus in which a fixed amount of lubricant oil is sealed in a lubricant storage chamber, said apparatus comprising a slider having two opposite sides and an end cap, a lubricant storage chamber formed within said slider and two lubricant guide passages formed within said slider with one lubricant guide passage on each of said two opposite sides of said slider with said lubricant storage chamber between said lubricant guide passages, a supply of lubricant oil within said lubricant storage chamber and a fibrous member inserted within said lubricant storage chamber and extending along both of said lubricant guide passages whereby said oil is absorbed by said fibrous member, two rolling element passages each disposed at one of said opposite sides of said slider within said slider and adjacent to one of said lubricant guide passages, a plurality of rolling elements within each of said rolling element passages, and said fibrous member protruding into each of said rolling element passages for contact by said rolling elements to thereby lubricate said rolling elements with said lubricating oil, an oil infusion aperture within said slider for replenishing said lubricant oil and a sealing washer interposed between said slider and said end cap to prevent leakage of lubricant oil therefrom.

2. The self-lubricating guide apparatus according to claim 1 in which said slider includes a center portion and wherein said lubricant storage chamber is formed in said center portion.

3. The self-lubricating guide apparatus according to claim 1 in which said slider includes two end portions and wherein said oil infusion aperture is formed in one of said end portions.

\* \* \* \* \*